United States Patent Office 3,546,060
Patented Dec. 8, 1970

3,546,060
FIBER-REINFORCED FOAM PLASTIC SHAPED ARTICLES
Peter Hoppe, Troisdorf, Karl August Essig, Dormagen, Goetz-Gotmar Dornheim, Leichlingen, Erich Bendler, Solingen-Ohligs, Karl-Arnold Weber, Cologne-Stammheim, and Wolfram von Langenthal, Cologne-Bickendorf, Germany, assignors to Farbenfabriken Bayer Aktiengesellschaft, Leverkusen, Germany, a corporation of Germany
Filed May 10, 1967, Ser. No. 637,403
Claims priority, application Germany, May 11, 1966,
F 49,177
Int. Cl. B32b 5/22; C08g 22/44
U.S. Cl. 161—156
4 Claims

ABSTRACT OF THE DISCLOSURE

Reinforcement of foam plastics with crimped synthetic monofilaments of a denier of at least about 40. The crimped monofilaments are disposed in a foam plastic article so as to form a reinforcing web. They may be arranged principally next to one or more layers of covering material or substrate.

---

Figure 1:
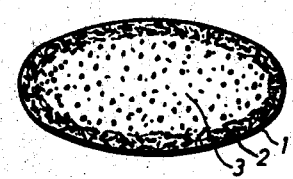

This invention relates to reinforcement of foam plastics with synthetic fibers.

It has heretofore been proposed to reinforce foam plastics of all types by synthetic fibers of any desired length for the purpose of increasing the mechanical strength. It has also been proposed to use stitched or quilted fiber webs or fleeces from synthetic fibers and use them in reinforcing foam plastics. It is known that the fibers may be added on mixing of the reactants so that they are uniformly distributed in the whole volume of the reinforced foam plastic of which the shaped articles are made. However, the stitched or quilted fiber webs have hitherto been used mainly for reinforcing the surfaces of shaped foam plastic articles of all types.

One disadvantage which occurs, nevertheless, especially where webs are used, is that it is not always possible to keep the web in a clearly defined position in the foam plastic during the foaming of the mixture although this is important in order to obtain the required mechanical strength. The reason for this is that the viscosity of the reaction mixture which is in the process of foaming increases with progressive cross-linking. The expanding foam therefore has an increasing tendency, especially towards the end of the expansion process, to displace any solid material, such as fibers, from its given position. This action of the expanding foam mixture is a disadvantage in cases where webs of individual fibers of low denier are used, for example, for reinforcing the marginal zones in foam plastic sandwich constructions.

The marginal zone reinforcement is intended in the first place to improve the mechanical bond between the supporting core of the sandwich and the covering or surface layer. Secondly, the fibers which are joined to the covering layers and extend into the supporting core are intended to distribute the load in cases where localized creasing occurs in sandwich covering layers which are subjected to a load. This desired effect cannot be achieved with best results if fibers of low denier are used for marginal zone reinforcements and the fibers become adhered to the covering layers before the central core with covering layers has completely expanded. Such fibers of low denier resist the expanding foam plastic only to a small extent. At the same time, as increase in viscosity progresses, the original thickness of the marginal zone reinforcement or fiber fleece is actually reduced due to escape of the fibers. This is because individual fibers of the fleece are pressed against the covering layer and consequently are positioned in the finished foam plastic parallel to the plane of the covering layer. The above-described desired effect of anchoring the sandwich covering layer in depth in the supporting core of the sandwich by positioning the reinforcing fibers as far as possible in a vertical orientation with respect to the covering layer may therefore lead to localized inhomogeneity or localized reduction in thickness of the fiber-reinforced marginal zone in sandwich constructions if, in the process of foaming, the viscosity of the reaction mixture exceeds that permissible for a given low denier.

It is therefore an object of this invention to provide a fiber-reinforced foam plastic which is devoid of the foregoing disadvantages.

A further object of this invention is to provide a shaped article of foam plastic of improved homogeneity of reinforcement.

Another object of this invention is to provide a fiber-reinforced sandwich structure having a foam plastic core.

Still another object of this invention is to provide a process for production of a foam plastic article reinforced by a fibrous web at one or two covering layers.

The foregoing objects and others which will become apparent from the following description are accomplished in accordance with this invention, generally speaking, by providing a shaped article of foam plastic, reinforced with smooth or textured crimped synthetic monofilaments of at least about 40 denier (in other words, a 9000 meter length would weigh at least 40 grams).

The monofilaments may be of any desired staple length and in the form of a web or fleece adjacent the covering or surface layers of a sandwich structure in which the foam plastic forms a central core or additionally running vertically between the covering or surface layers at intervals. The preferred staple fiber length is from about 0.1 cm. to about 10 cm. Also the reinforcing monofilament web may be adjacent a single backing or substrate which contains the foam plastic.

The amount of crimp may range from about 1 to about 100 crimps per cm. The synthetic monofils of individual denier above about 40 used according to the invention provide sufficient resistance against the increase in viscosity of the expanding foam reaction mixture to prevent any substantial change in position, deformation or undue localized inhomogeneity.

When used as marginal zone reinforcing material for sandwich supporting cores based on foam plastic, fleeces or webs of these at least about 40 denier monofilaments insure homogeneity of the foam plastic marginal zone over the entire sandwich body, thereby providing optimum static and dynamic strength.

The crimped monofilaments for use in reinforcing foam plastics according to our invention may be prepared according to known methods, for example, by passing monofilaments of the desired material through a conventional crimper such as a stuffer box crimper or by hand crimping. For the production of the crimped monofilament webs of this invention, the individual crimped monofils of desired length may be subjected to known laying and stitching processes. Depending on the purpose for which the reinforced foam plastic articles are to be used, including sandwich constructions, these webs or fleeces may have weights per square meter of, for example, 50 to 1,000 g. or more, and their thickness may be varied, for example, by means of suitably applied laying or stitching techniques. Such crimped webs are characterized, especially if they are stitched webs, by excellent felting and rigidity. Rigidity can be improved still further to meet requirements by use of natural or synthetic strengthening agents in addition to the monofilaments.

According to the invention, reinforcing webs of pure synthetic monofils may be used. However, webs made from such monofils mixed with natural, mineral, metallic or other synthetic fibers may also be used.

The efficiency of the crimped webs according to the invention as a marginal zone reinforcing material for sandwich supporting cores of foam plastic depends upon the strength of adhesion of the reinforced foam plastic to the above-described types of webs. It is therefore advantageous to pretreat the crimped webs with compounds which have reactive groups capable of reacting with the reaction mixture which is to produce the foam plastic. In this way the adhesion between foam plastic and reinforcement web may be improved. For example, the preparations may contain hydroxyl (OH) groups in cases where polyurethane foam reaction mixtures capable of being blown or expanded are used. Compounds containing such reactive groups include, for example, hydroxyl polyesters, polyhydric polyalkylene ethers and the like. The bond strength obtainable, for example, between polyurethane foam plastic and fiber, can be made to correspond to the shear strength for the weight per unit volume of the particular foam plastic used.

The crimped webs of this invention have proved to be especially suitable for reinforcements made of polyamides such as those known as and available on the market as nylon. The chemical structure and preparation of polyamides is described on pp. 34–35 of Battista's textbook entitled "Fundamentals of High Polymers" (Reinhold Publishing Corporation, New York, 1958). Polyamide monofils have a high modulus of elasticity and are exceptionally resistant to breaking when folded. However, other synthetic fibers known to have such high resistance to breakage upon folding may be used as the at least 40 denier monofilaments, including, for example, polyesters, polyesteramides, polyolefins, cellulose esters and the like. These reinforcing fibers may also be used for low density materials based on porous concrete such as, for example, that described in U.S. Pat. 3,211,675.

Suitable substances for use as the base or core foam plastic according to the invention include, for example, polyurethanes such as, for example, those described in U.S. Pat. 3,006,870; 3,070,556; 3,074,894 and 3,125,540, polyamides, phenol-formaldehyde resins, the chemistry of which is discussed on pp. 230–236 of Rigid Plastics Foams by T. H. Ferrigno, Reinhold Publishing Corp., New York, 1963, unsaturated polyester resins, epoxide resins, vinyl polymers such as, for example, polyvinyl chloride, polystyrene and foam plastics based upon ceramic or bituminous material.

The reinforced shaped articles according to the invention may consist solely of foam plastics of any desired size and geometrical shape or they may be laminated with covering layers of other materials such as metal, wood, cardboard, paper or synthetic resins. In other words, they may be of sandwich constructions.

The reinforcing material according to the invention may also be used in other ways in addition to reinforcing the marginal zone of a foam plastic article. In various fields of application of foam plastics of the soft elastic, semi-hard or hard type, it is advantageous to reinforce the whole volume of the foam plastic body. For this purpose, a hollow body, for example, a foaming mold or sandwich construction with a covering or surface layer is completely filled with the crimped monofilaments or crimped monofil web before the foaming process so that, when the mold or hollow body is closed, the crimped web packing is held under a certain preliminary pressure. This fixes the position in which the packing is placed into the foam. The preliminary pressure required in the case of a polyurethane foam is generaly from about 10 to about 100 p.s.i.g. Another manner in which the fiber-reinforced foam plastic article of this invention may be formed is by pretreating the well of the mold or covering layers facing the web or fleece with a bonding agent such as, for example, a polyurethane adhesive prepared from combinations of polyesters and diisocyanates as described in Angew. Chem. A59, 275 (1947) or a vinyl plastisol before the mold or other forming means are closed. This preliminary treatment fixes or establishes the surfaces of the inserted crimped fleece or web packing.

In the course of the foaming process in which the foam mixture components such as polyol, polyisocyanate, blowing agent and stabilizer or surfactant react to produce the foam, according to one embodiment of this invention as the foam rises, it penetrates the permeable crimped web. When such a free-rise system is used, the resulting foam plastic articles thus have the reinforcing monofilament web or fleece distributed in a clearly defined pattern over substantially the whole volume. The preferred weight per unit volume of such homogeneously reinforced foam plastic articles is between about 20 and 800 kilograms per cubic meter (kg./m$^3$). Variation within this range is possible as desired. This depends upon whether the foam plastic is to be used by itself as is or as a sandwich supporting core in laminate form.

According to another embodiment of our invention, instead of using the crimped web reinforcements to fill the entire cross-section of a foam plastic article, they may be used locally, for example, to obtain a localized or concentrated increase in the mechanical strength of the foam plastic in regions of stress or strain. As explained above, this may be accomplished by pressure or other means to fix the position of the fibrous web.

Sometimes it is advantageous to combine more than one crimped web so as to have reinforcements of different weights per square meter and different thicknesses. In other words, a web which reinforces the entire marginal zone of a foam plastic article may be provided with a foam-permeable web packing which reinforces the cross-section of the foam plastic body either entirely or only in localized areas.

It is also possble according to the invention to produce, for example, a foam plastic plate which has a reinforcing web projecting on one side of the plate without having been permeated with foam. This may be done, for example, by placing the web into a preliminary molding of an expandable polyurethane reaction mixture which, when the foaming reaction or rise has been completed, has a thickness one-half or three-quarters (½ or ¾) that of the web, and then applying a light counter-pressure, keeping the web in position to prevent it from floating out.

For a better understanding of our invention, reference will now be made to the drawing.

In the drawing, FIG. 1 is a cross-section through a reinforced foam plastic body. Such a plastic body 3 is shown in a mold 1 provided with mold release agent and lined with adhesive. Into the mold containing the foam plastic has been inserted a crimped monofilament web of reinforcing material 2. This web, which acts as a marginal zone reinforcement, has been inserted so as to be positioned at the surface of the foam plastic body.

Figure 2:
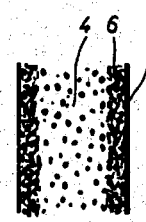

FIG. 2 is a section through a sandwich construction having a supporting core of foam plastic 4 partly reinforced with a crimped web 6. The crimped web is arranged below the covering layers 5 of the sandwich and forms a reinforced marginal zone in the foam plastic.

Figure 3:
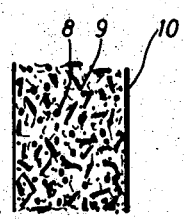

FIG. 3 is a cross-section of a sandwich construction having a crimped web 9 which reinforces substantially the entire foam plastic supporting core 8, and covering layers 10.

Figure 4:
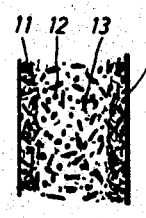

FIG. 4 shows a portion of a sandwich construction in which crimped webs of different thicknesses and weights per square meter are used as a marginal zone reinforcement 11 and as an internal reinforcement 12 for the core 13. The covering layers are indicated at 14.

Figure 5:
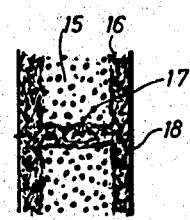

FIG. 5 shows a portion of a sandwich construction which has a foam plastic supporting core 15. The core is provided with a dense and heavy crimped web marginal zone reinforcement 16 and a localized loose and lightweight crimped web reinforcement 17. The covering layers are indicated at 18.

Figure 6:
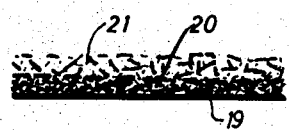

FIG. 6 shows a portion of a foam plastic plate 20 provided on one side with a supporting material 19. From one side of the plate projects a reinforcing crimped web 21 of approximately twice the thickness of the foam plastic plate.

The invention is further illustrated but is not intended to be limited by the following example in which the parts are by weight unless otherwise specified.

EXAMPLE

Shaped articles were prepared by positioning crimped monofilament webs in various positions of the mold to form the fiber-reinforced foam plastic construction depicted in FIGS. 1-6 of the drawing. Polyamide monofilaments of 45 denier and 5 crimps per cm. were used as the reinforcing material. Mixing and introduction of foam mixture into the mold was accomplished substantially in the following manner.

The following reaction ingredients are admixed in a mixing device as disclosed in U.S. Re. Pat. 24,514 having four entrance conduits at the upper portion of the mixer. About 100 parts of a polyhydric poly alkylene ether prepared by condensing propylene oxide with glycerine until a product having a molecular weight of about 3,000 and an hydroxyl number of 56 results are introduced through one conduit. About 38 parts of a mixture of 80% 2,4-tolylene diisocyanate and 20% 2,6-tolylene diisocyanate are introduced through a second conduit. About 0.5 part of N-ethyl morpholine, about 0.1 part tetramethyl-1,3-butane diamine and about 0.3 part stannous octoate are introduced through a third conduit. About 1.0 part of a silicone copolymer having the formula:

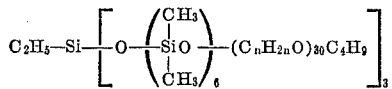

about 2.9 parts water and about 0.4 part resorcinol are introduced through a fourth conduit. The reactants and other ingredients are intimately mixed in the mixing device and poured into a suitable mold containing the crimped monofilament web. A 10 in. block of cellular material results.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A shaped laminate having covering layers and a foam plastic supporting core reinforced with crimped synthetic staple monofilaments having from about 1 to about 100 crimps per centimeter and a denier of at least about 40, said monofilaments being arranged in webs adjacent said covering layers.

2. The shaped article of claim 1 in the form of a foam plastic plate from which the crimped monofilaments project as a web from a layer of the foam plastic joined to a substrate of supporting material, the projecting web from the point of projection from the layer of foam plastic being of a thickness about equal to the thickness of the layer of foam plastic.

3. The shaped article of claim 1 wherein the foam plastic is polyurethane and the crimped synthetic monofilaments are polyamide.

4. The shaped article of claim 1 wherein a portion of the crimped monofilaments forms at least one band extending between the external layers.

References Cited

UNITED STATES PATENTS

| | | | |
|---|---|---|---|
| 2,763,624 | 9/1956 | Newell | 260—2.5 |
| 3,025,202 | 3/1962 | Morgan et al. | 156—34 |
| 3,050,427 | 8/1962 | Slayter et al. | 156—26 |
| 3,223,576 | 12/1965 | Evans et al. | 161—84 |
| 3,340,335 | 7/1967 | Winchcombe | 264—45 |
| 3,382,302 | 5/1968 | Marzocchi | 264—45 |
| 3,483,069 | 12/1969 | Cairns et al. | 161—59 |

DONALD E. CZAJA, Primary Examiner

F. E. McKELVEY, Assistant Examiner

U.S. Cl. X.R.

117—140; 156—78; 161—159, 161, 170, 190, 227, 238, 268; 260—2.5; 264—45, 47